Patented Mar. 27, 1923.

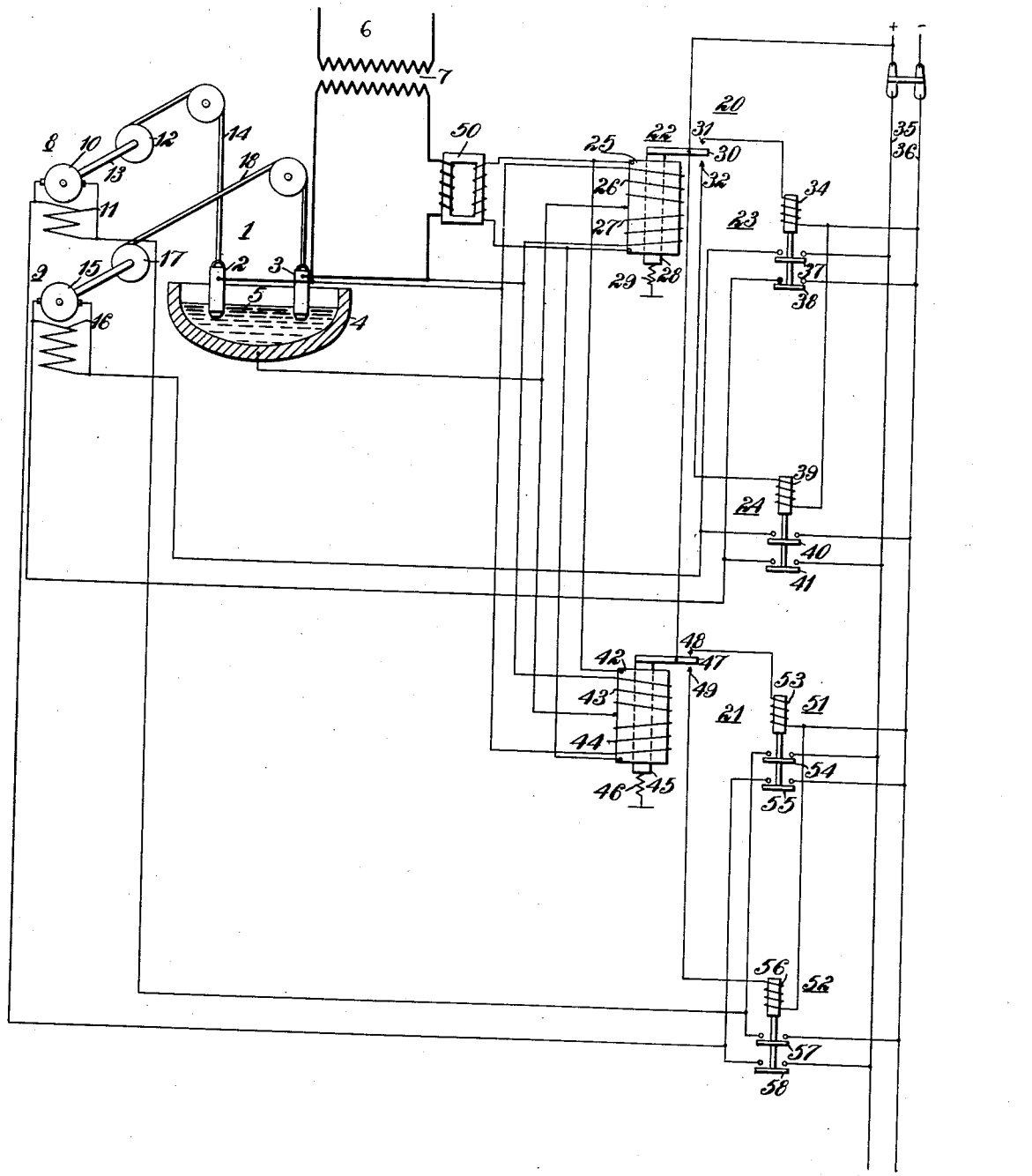

1,449,896

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

FURNACE-REGULATOR SYSTEM.

Application filed October 16, 1918. Serial No. 258,365.

*To all whom it may concern:*

Be it known that I, ROBERT D. EVANS, a citizen of the United States, and a resident of Wilkinsburg, in the county of Allegheny and State of Pennsylvania, have invented a new and useful Improvement in Furnace-Regulator Systems, of which the following is a specification.

My invention relates to regulator systems and particularly to regulator systems for governing the operation of electric furnaces.

One object of my invention is to provide an electric furnace, having a separate motor for raising and for lowering each movable electrode, with a regulator system that shall govern the operation of the several electrode motors in accordance with the power supplied to the furnace.

More specifically, my invention embodies a regulator system of the above indicated character for controlling the operation of an electric furnace which is connected to a single-phase supply circuit, that shall govern the operation of the several electrode motors not only in accordance with the current flowing through the associated movable electrode but also in accordance with the potential existing between the bath of material being treated and the movable electrode.

When a regulator system is applied to an electric furnace which is connected to a single-phase supply circuit, it will be noted that it is impossible to obtain satisfactory operation of the two movable electrodes of the furnace strictly in accordance with the current flowing through the several electrodes inasmuch as a slight difference in the setting of the two regulators, which are respectively associated with the two movable electrodes, may cause one regulator to raise its associated electrode from contact with the bath of material being treated and cause the second regulator to lower its electrode down into the bath of material.

In order to avoid the above-mentioned difficulty, which is encountered whenever the two movable electrodes of a furnace are connected to a single-phase supply-circuit, and the regulator associated with each electrode is operated solely in accordance with the current flowing through the furnace, it has been proposed to govern one regulator in accordance with the current supplied to the furnace and to govern the second regulator in accordance with the potential across one of the arcs. In such a system, the regulator which is governed in accordance with the current supplied to the furnace will adjust its associated electrode for the correct amount of current but the regulator which is governed in accordance with the voltage will only operate in a manner to maintain a definite voltage across one of the arcs.

In an electric furnace connected to a single-phase supply circuit, and provided with regulators constructed in accordance with my invention, the two regulators, which are associated with the two movable electrodes, are each controlled in accordance with the current passing through the associated electrode and in accordance with the potential existing between the electrodes and the bath of material being treated. Consequently, each electrode is adjusted not only in accordance with the current flowing through it but also in a manner to maintain equal potentials across the two arcs of the furnace.

In the preferred embodiment of my invention, each regulator comprises a main control magnet having a current winding, which is energized in accordance with the current flowing through the electrode, and two differential voltage windings, which are respectively energized in accordance with the potentials obtaining across the two arcs of the furnace. Thus, it is apparent that the two voltage windings will neutralize each other when equal potential obtains across the two arcs and the electrode will be controlled in accordance with the current flowing through it. However, if unequal potentials exist across the two arcs, then the differential voltage windings will assist or oppose the current winding according to the relative positions of the two electrodes. Thus, if a difference of potential exist across the two arcs, then the electrode which is forming the arc having the lower potential across it will be raised and the electrode which is forming the arc having a higher potential across it will be lowered. Consequently, the two movable electrodes of the furnace are operated in a manner to prevent any unbalanced operation of the furnace.

The single figure of the accompanying drawing is a diagrammatic view of a regulator system embodying my invention.

Referring to the drawing, an electric furnace 1, embodying two movable electrodes 2 and 3, and a receptacle 4, containing the bath of material 5 to be treated, is connected across a single-phase supply-circuit 6 by means of a transformer 7. The two movable electrodes 2 and 3 are respectively provided with motors 8 and 9 for adjusting their position relative to the bath of material 5. The motor 8 embodies an armature 10 and a field winding 11, and is mechanically connected to the electrode 2 in any suitable manner such as by means of a drum 12. The drum 12 is mounted on the armature shaft 13 and a flexible connector 14, which is directly connected to the electrode 2, is adapted to be wound on the drum 12. The motor 9 embodies an armature 15 and a field winding 16, and is connected to the electrode 3 by means of a drum 17 and a flexible connector 18, similar to the connection between the electrode 2 and the motor 8.

A regulator 20 is provided for controlling the operation of the motor 9 in order to adjust the position of the electrode 3 in accordance with the current and the voltage conditions obtaining in the furnace and a similar regulator 21 is provided for controlling the motor 8 in order to adjust the position of the electrode 2.

The regulator 20 comprises a main-control magnet 22 and two switches 23 and 24 which are controlled by the magnet 22 for governing the direction of rotation of the motor 9. The main-control magnet 22 is provided with a current winding 25 which is energized in accordance with the current supplied to the furnace and two differential voltage windings 26 and 27 which are respectively energized in accordance with the arcs effected by the movable electrodes 2 and 3. The main-control magnet 22 is further provided with a core member 28 which is maintained in a neutral position by means of a spring 29 and which serves to operate a contact terminal 30 into engagement either with a contact finger 31 or a contact finger 32 according to the energization of the magnet.

The switch 23 embodies a winding 34, which is connected across an auxiliary supply circuit comprising conductors 35 and 36 whenever the contact members 31 and 30 are in engagement with each other, and two switch members 37 and 38 which are adapted to connect the motor 9 across the supply conductors 35 and 36 so as to operate the motor in a counter clockwise direction and raise the electrode 3 from the bath of material 5. The switch 24 comprises a winding 39, which is connected across the supply conductors 35 and 36 by means of the contact members 30 and 32 of the main-control magnet 26, and two switch members 40 and 41 which serve for completing a circuit from the supply conductors 35 and 36 through the motor 9 so as to operate the motor in a clockwise direction and permit the lowering of the electrode 3.

The main-control electromagnet 21 embodies a current winding 42, which is energized in accordance with the current supplied to the furnace, and two differential windings 43 and 44 which are respectively energized in accordance with the potential across the arcs formed by the electrodes 3 and 2. The electromagnet 21 is further provided with a core member 45, which is retracted by means of a spring 46, and a contact member 47 which is selectively moved into engagement with the contact terminals 48 and 49 according to the energization of the magnet. The current windings 25 and 42 of the main control electromagnets 22 and 21 are connected to the supply circuit 6 by means of a current transformer 50.

Two switches 51 and 52, which serve to govern the direction of rotation of the motor 8, are selectively energized by the main control electromagnet 21 in accordance with the voltage and current condition of the electrode 2. The switch 51 embodies a winding 53, which is connected across the supply conductors 35 and 36 by means of the contact members 47 and 48, and two switch members 54 and 55 which serve for connecting the motor 8 across the supply conductors 35 and 36 in a manner to rotate it in a counterclockwise direction and thus raise the electrode 2. The switch 52 embodies a winding 56, which is connected across the supply conductors 35 and 36 by means of the engagement of the contact members 47 and 49, and two switch members 57 and 58 which serve to connect the motor 8 across the supply conductors 35 and 36 in a manner to effect clockwise rotation thereby and thus permit the lowering of the electrode 2.

Assuming the two electrodes 2 and 3 to be simultaneously raised equal distances above the bath of the material 5 so as to reduce the current flow through the furnace then the current windings 25 and 42 of the main-control magnets 22 and 21 will be de-energized to an extent such that will permit the engagement of the contact members 30 and 32 and the contact members 47 and 49. Upon engagement of the contact members 30 and 32 and the contact members 47 and 49, the switches 24 and 52 are operated to effect clockwise rotation of the motors 3 and 9 and thus permit the lowering of the electrodes 2 and 3 so that the current flow through the furnace is increased. In like manner, if the electrodes 2 and 3 are the same height above the bath of material 5 and the current flow through the furnace is increased above normal value, then the main control magnets 22 and 21 are operated to effect engagement of the contact members 31 and 30 and the contact members 48 and 47. Consequently, the switches 23 and 51 are operated to effect rotation of the motors 9 and 8 in a clockwise direction and thus simultaneously raise the two electrodes 2 and 3.

In case the electrodes 2 and 3 are moved uneven distances from the bath of material 5, then the motors 8 and 9 are selectively rotated in opposite directions so as to balance the action of the elctrodes and maintain the arcs formed thereby substantially equal. Thus, in case the electrode 3 is raised a greater distance above the bath of material 5 than the electrode 2 then the potential across the arc formed by the electrode 3 will be greater than the potential across the arc formed by the electrode 2. Consequently, the differential voltage windings 27 and 26 of the main control magnet 22 will be differentially energized and the winding 27, which is energized by a current having a potential higher than the current which energizes the winding 26, will oppose the action of the current winding 25 and thus effect engagement of the contact members 30 and 32. Thus, the switch 24 is operated and a circuit is completed through the motor 9 in a manner to effect rotation thereby in a clockwise direction and thus permit the lowering of the electrode 3. Simultaneously with the above action, the differential voltage windings 43 and 44 of the main-control magnet 21 are differentially energized by reason of the different potentials existing across the arcs formed by the electrodes 2 and 3. The winding 43, which is energized to a higher degree than the winding 34, assists the current winding 42 and effects engagement of the contact members 47 and 48. Upon engagement of the contact members 47 and 48, the switch 51 is operated to effect rotation of the motor 8 in a counterclockwise direction and thus raise the electrode 2 from the bath of material 5. This operation continues in a like manner until the arcs formed by the two electrodes are equal and the current flowing through the furnace is at a normal value. In case the electrode is raised to a greater distance above the bath of material 5 than the electrode 3, then a reverse operation of the regulators and of the motors 8 and 9 will take place.

From the above description, it is apparent that the two electrodes of the electric furnace which are connected to a single-phase supply circuit are adjusted in accordance with the current supplied to the furnace and are maintained equal distances above the bath of material that is being treated.

Modifications in the system and arrangement and location of parts may be made within the spirit and scope of my invention and such modifications are intended to be covered by the appended claims.

I claim as my invention:

1. In combination, an electric furnace having two movable electrodes, a single-phase supply circuit connected to the furnace, and means for operating each electrode of the furnace in accordance with the potential across the arc produced between it and the bath and in accordance with the current flowing through the furnace.

2. In a regulator for a single phase electric furnace, a motor for raising and lowering each electrode, and means for operating each motor in accordance with the current flowing through the furnace and in accordance with the potential across the arc of the associated electrode.

3. A regulator for an electric furnace having a plurality of movable electrodes and a bath of material, comprising a motor for each of the electrodes adapted to operate the same and an electromagnet associated with each motor for governing the operation thereof, each of said electromagnets being provided with current and voltage windings.

4. In a regulator for an electric furnace having movable electrodes, motors for raising and lowering the electrodes and a relay having a current winding and two voltage windings for governing the operation of each motor.

5. In combination, an electric furnace, a single-phase supply circuit connected to the furnace, and means for automatically raising and lowering each electrode of the furnace in accordance with the arc produced between it and the bath and in accordance with the current flowing through the furnace.

6. In combination, an electric furnace, a single-phase supply circuit connected to the furnace, and means comprising a relay having a current and two voltage windings for operating each electrode in accordance with the arc produced by it and in accordance with the current flowing through the furnace.

7. In a regulator for an electric furnace having two movable electrodes, an alternating current supply circuit connected to said electrodes, two motors for respectively operating said electrodes, and means comprising an electromagnet for operating each motor said electromagnets being energized in accordance with the current flowing through the furnace and in accordance with the potential between the bath of material being treated and the electrode operated by the respective motor.

8. A regulator for an electric furnace having a plurality of electrodes and a bath of material, comprising motors for severally operating said electrodes, and means for controlling the operation of each motor, said means comprising an electromagnet adapted to be energized in accordance with the current flowing through, and the potential between, the associated electrode and the bath of material being treated.

9. In a regulator for an electric furnace, two electrodes connected to a single-phase supply circuit, two motors for severally raising and lowering said electrodes, and means for operating each of said motors in accordance with the potential between the associated electrode and the bath of material being treated and in accordance with the current flowing through the furnace.

10. In a regulator for an electric furnace, two electrodes connected to a single-phase supply circuit, two motors for severally operating said electrodes, two electromagnetic devices for selectively operating the motors in accordance with the current flowing through the furnace and in accordance with the potential between the individual electrodes and the bath of material being treated, each of said devices comprising a winding energized in accordance with the current flowing through the furnace and two differential windings which are respectively energized in accordance with the potential between the individual electrodes and the bath of material being treated.

11. In a regulator for an electric furnace having two electrodes, the combination with two motors for raising and lowering the electrodes, of two relays for respectively controlling the operation of said motors, each of said relays having a winding energized in accordance with the current flowing through the furnace and two windings severally energized in accordance with the potentials between the bath of material and the two movable electrodes.

12. In combination, an electric furnace having a plurality of electrodes, a single-phase supply circuit connected to the furnace, and automatic means comprising a plurality of coils differentially energized from the circuits of said electrodes for maintaining equal potentials across the arcs of the furnace under variable supply-circuit voltage conditions.

13. In combination, an electric furnace having two movable electrodes, a single-phase supply circuit connected to said electrodes, and means for operating each electrode in accordance with the voltages across the arcs produced by the two electrodes.

14. In a regulator for an electric furnace having movable electrodes, means for moving said electrodes, and an electromagnet having windings energized respectively in accordance with the current traversing said electrodes and the difference of the potential drops between the individual electrodes and the bath of material being treated.

15. In a regulator for an electric furnace having movable electrodes, means for moving said electrodes, and an electromagnet having three cooperating windings, one energized in accordance with the current traversing the electrodes, a second winding energized in accordance with the voltage of the arc of one electrode and a differential winding energized in accordance with the voltage of the arc of another electrode.

16. In a regulator for an electric furnace having movable electrodes, means for moving said electrodes, and an electromagnet having three cooperating windings, one energized in accordance with the current traversing the electrodes, a second winding energized in accordance with the voltage of the arc of one electrode and a differential winding energized in accordance with the voltage of the arc of another electrode, whereby the voltage drop across the various arcs is maintained substantially equal under varying voltage of the supply circuit.

17. In a regulator for a single phase electric furnace having movable electrodes, means for moving said electrodes, and an electromagnet having three cooperating windings, one energized in accordance with the current traversing the electrodes, a second winding energized in accordance with the voltage of the arc of one electrode and a differential winding energized in accordance with the voltage of the arc of the other electrode.

18. In a regulator for an energy translating device having a plurality of resistance-varying members, automatic means for operating each of said resistance varying members in accordance with the difference of the voltage drops across said resistance-varying members.

In testimony whereof, I have hereunto subscribed my name this 25th day of Sept. 1918.

ROBERT D. EVANS.